Patented Jan. 19, 1954

2,666,763

UNITED STATES PATENT OFFICE 2,666,763

DERIVATIVES OF 3-AMINO-2,3-DIHYDRO-THIONAPHTHENE-1,1-DIOXIDE

John W. Cusic, Skokie, Ill., assignor to G. D. Searle & Co., Chicago, Ill., a corporation of Illinois No Drawing. Application March 16, 1953,
Serial No. 342,734

9 Claims. (Cl. 260—247.1)

The present invention relates to a new class of derivatives of sulfur-containing heterocycles and, more particularly, to derivatives of 3-amino-2,3-dihydrothionaphthene-1,1-dioxide. The 2,3-dihydrothionaphthene-1,1-dioxide derivatives of this invention can be represented as the bases of the structural formula

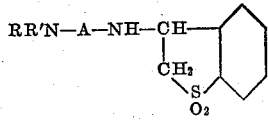

and their salts wherein A is a lower alkylene radical separating the two nitrogen atoms attached thereto by at least two carbon atoms and R and R' are either lower alkyl or hydrogen radicals and in which RR'N can also be a nitrogen-containing saturated heteromonocycle attached to the hydrocarbon radical A through a nitrogen in the heteromonocycle.

This application is a continuation-in-part of my copending application Serial No. 223,459, filed April 27, 1951.

In the foregoing structural formula the radical A represents a bivalent, saturated, aliphatic hydrocarbon radical, derived from a straight-chain or branched-chain hydrocarbon, which includes radicals such as ethylene, propylene, butylene, amylene, hexylene and polymethylene radicals such as trimethylene, tetramethylene, pentamethylene and hexamethylene. The radicals R and R' can represent a hydrogen, methyl, ethyl, propyl, butyl, amyl, and hexyl radical wherein the propyl, butyl, amyl and hexyl radicals can be either of the straight-chain or branched-chain type. The radical RR'N can also represent a nitrogen-containing saturated heteromonocycle attached to the radical A through a nitrogen in the heteromonocycle. Radicals falling within this class are piperidine, lupetidine, pyrrolidine, morpholine, thiamorpholine, quinoline, isoquinoline, piperazine, N'-alkylpiperazine and the like.

The organic bases of the foregoing type form non-toxic salts with a variety of inorganic and strong organic acids including sulfuric, phosphoric, hydrochloric, hydrobromic, sulfamic, citric, ascorbic, and related acids.

These compounds also form non-toxic quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

One of the preferred methods for the preparation of the amines of this invention consists in the condensation of thionaphthene-1,1-dioxide with an excess of a diamine of the type

in the presence of an organic solvent such as a lower alcohol, all symbols being defined as hereinabove.

The compounds of my invention furnish medicinal agents useful especially in the types of cardiovascular irregularities in which quinidine is indicated. The claimed compounds are valuable intermediates in organic synthesis. Thus acylation yields amides of the type

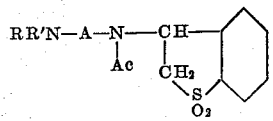

wherein Ac represents an acyl group such as acetyl, propionyl, butyryl and other alkanoyl radicals and especially isocarbocyclanecarbonyl radicals, such as cyclopentanecarbonyl, cyclohexanecarbonyl, benzoyl, naphthoyl, fluorenoyl, and the like. These amides are valuable as cardiovascular agents.

The claimed amines can be alkylated and aralkylated in the usual manner using alkyl halides and aralkyl halides, respectively. In this fashion compounds of the following type are obtained:

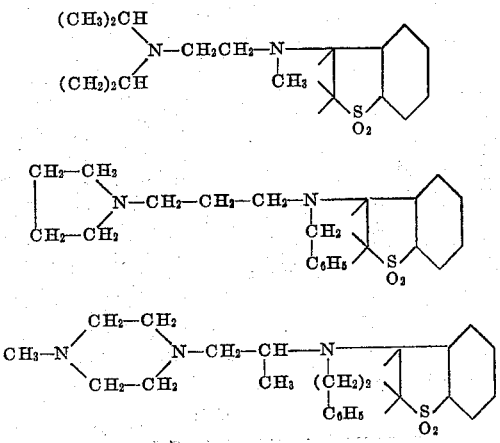

My invention will be described more fully in conjunction with the following examples. It should be understood, however, that these examples are given by way of illustration only and that the invention is not to be construed as limited in spirit or in scope by the details set forth. It will be apparent to those skilled in the art that many modifications in materials and methods may be made without departing from the invention. In each of these examples temperatures are given uncorrected in degrees centigrade (° C.) and amounts of material in parts by weight.

*Example 1*

A mixture of 300 parts of thionaphthene-1,1-dioxide, 400 parts of N,N-diethylethylenediamine and 2500 parts of ethanol is stirred and after standing for one hour, heated at refluxing temperature for two hours. The mixture is then concentrated on the steam bath after which ice and dilute hydrochloric acid are added. A portion of the material does not dissolve and is removed on a filter. The filtrate is rendered alkaline by addition of sodium hydroxide and extracted with ether. The ether extract is washed with water and then dried over anhydrous potassium carbonate, filtered and evaporated in vacuo. The 3-(β-diethylaminoethyl)amino-2,3-dihydrothionaphthene-1,1-dioxide forms an oil. It has the structural formula

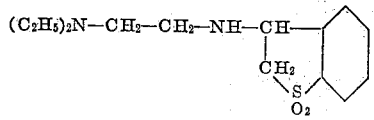

A series of crystalline derivatives can be prepared. Thus, 200 parts of the amine can be heated at refluxing temperature with 140 parts of cyclohexanecarbonyl chloride in 2400 parts of benzene for 12 hours. After cooling, the oily precipitate is separated, taken up in isopropanol and stirred with charcoal. The filtrate is treated with ether and a sticky precipitate is thus obtained. The 3-[N-(β-diethylaminoethyl)cyclohexanecarboxamido]-2,3-dihydrothionaphthene-1,1-dioxide is obtained in crystalline form by extraction with ether, drying and concentration of the extract. On recrystallization from ethanol it melts at about 137–138° C. It has the structural formula

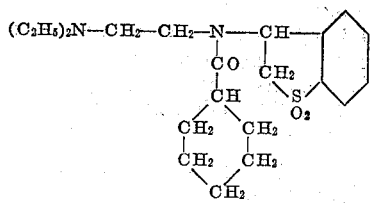

Other crystalline derivatives of the amine are obtained by treatment with other acyl halides, alkyl halides, and aralkyl halides. N-(β-diethylaminoethyl)-N-methylamino-2,3-dihydrothionaphthene-1,1-dioxide is obtained by treatment with slightly more than one molecular equivalent of dimethyl sulfate in alkaline solution. A dimethohalide of this compound is obtained by more vigorous methylation, such as treatment with an excess of methyl iodide in a solvent such at butanone. The cation has the structural formula

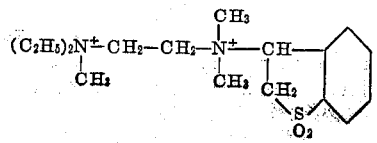

*Example 2*

A mixture of 100 parts of thionaphthene-1,1-dioxide and 100 parts of putrescine in 800 parts of ethanol is stirred at reflux temperature for an hour and then concentrated on the steam bath. Ice and dilute hydrochloric acid are added and the acidic layer is separated, washed with ether and rendered alkaline by addition of dilute ammonium hydroxide. There occurs separation of an oil which is extracted with ether. The ether extract is washed with water, dried over anhydrous calcium sulfate, stirred with charcoal, filtered and evaporated yielding the 3-(δ-aminobutyl)amino-2,3-thionaphthene-1,1-dioxide as an oil which decomposes when distillation is attempted. The infrared absorption spectrum of the compound shows maxima at about 2.82, 3.35, 7.7 and 13.7 microns. The product has the structural formula

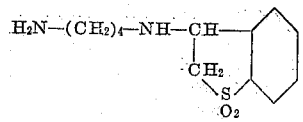

*Example 3*

A stirred mixture of 80 parts of N,N-dimethylputrescine and 60 parts of thionaphthene-1,1-dioxide in 500 parts of ethanol is heated at reflux temperature for 90 minutes, partially concentrated on the steam bath and then treated with ice and dilute hydrochloric acid. The aqueous layer is separated, washed with ether and rendered alkaline by addition of dilute sodium hydroxide solution. The oily base is extracted with ether and the extract is washed with water, dried over anhydrous potassium carbonate, filtered and stripped of solvent under vacuum to yield the 3-(δ-dimethylaminobutyl)amino-2,3-thionaphthene-1,1-dioxide which has a yellowish oil. The infrared absorption spectrum shows maxima at about 3.35, 7.25, 7.7 and 13.7 microns. The compound has the structural formula

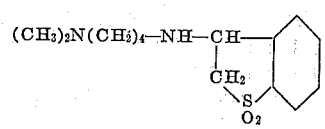

*Example 4*

A mixture of 100 parts of thionaphthene-1,1-dioxide and 100 parts of N-(β-aminoethyl)-piperidine in 800 parts of ethanol is stirred and heated at reflux temperature for 40 minutes and then concentrated on the steam bath. The resulting mixture is cooled and extracted with dilute hydrochloric acid. The extract is washed with ether, rendered alkaline by addition of dilute sodium hydroxide and extracted with ether. This extract is dried over anhydrous sodium sulfate, filtered and freed from solvent under vacuum to yield the 3-(N-piperidinoethyl)-amino-2,3-thionaphthene-1,1-dioxide as a yellowish oil. The infrared absorption spectrum shows maxima at about 3.35 and 7.71 microns. The compound has the structural formula

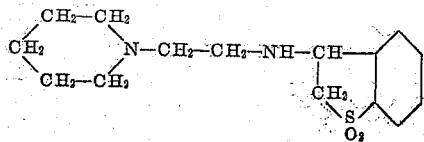

Example 5

A mixture of 20 parts of thionaphthene-1,1-dioxide and 20 parts of N-(δ-aminobutyl)pyrrolidine in 60 parts of ethanol is heated at reflux temperature for an hour with stirring and then concentrated and cooled. The resulting reaction mixture is extracted with dilute hydrochloric acid. The extract is washed with ether, rendered alkaline by addition of dilute ammonium hydroxide and then extracted with ether. This extract is dried over anhydrous calcium sulfate, filtered and evaporated under vacuum to yield the 3-(N-pyrrolidinobutyl)amino-2,3-thionaphthene-1,1-dioxide. Its infrared absorption spectrum shows maxima at about 3.35, 7.7 and 13.7 microns. It has the structural formula

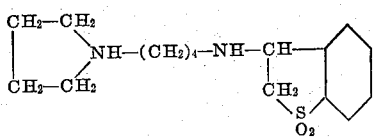

Example 6

300 parts of thionaphthene-1,1-dioxide are heated at refluxing temperature with 300 parts of N-(β-aminoethyl)morpholine in 2400 parts of ethanol for thirty minutes. The product is concentrated on the steam bath and then treated with ice and dilute hydrochloric acid. The acid layer is separated and rendered alkaline by addition of dilute potassium hydroxide solution. An oil forms which is extracted with a mixture of benzene and ether. The extract is dried over anhydrous potassium carbonate, filtered and evaporated. Distillation of the 3-(N-morpholinoethyl)amino - 2,3 - dihydrothionaphthene - 1,1 - dioxide is inadvisable because of decomposition. The compound has the structural formula

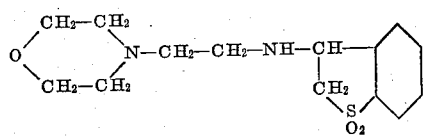

It is suitably purified by treatment of a butanone solution with charcoal.

One-half of the butanone solution thus obtained is treated with 200 parts of cyclohexanecarbonyl chloride in 800 parts of butanone by heating at refluxing temperature for 15 hours. The resulting solution is concentrated on the steam bath and on addition of dilute hydrochloric acid the precipitate which forms during the concentration redissolves. The solution is washed with ether and then rendered alkaline by addition of ammonium hydroxide and extracted with ether. The ether extract is dried over anhydrous potassium carbonate, filtered and evaporated. The residual solid is recrystallized from ethanol. The 3-[N-(N-morpholinoethyl)cyclohexanecarboxamido] - 2,3 - dihydrothionaphthene-1,1-dioxide melts at about 145–146° C. It has the structural formula

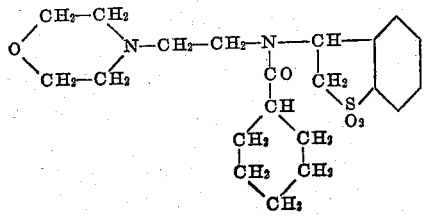

A butanone solution of 3-(N-morpholinoethyl) - amino - 2,3 - dihydrothionaphthene - 1,1 - dioxide, obtained from 300 parts of thionaphthene-1,1-dioxide as hereinabove, is benzoylated by heating at refluxing temperature for 15 hours with 400 parts of benzoyl chloride in 2000 parts of butanone. The resulting solution is concentrated on the steam bath and treated with dilute hydrochloric acid. The acid solution is washed with ether, rendered alkaline, and extracted with a mixture of ether and benzene. The extract is dried over anhydrous potassium carbonate, filtered, and evaporated. The residual oil is stirred with charcoal in hot benzene solution and filtered. The filtrate is cooled and treated with a 25% solution of hydrogen chloride in ethanol and with ether whereby a semi-solid yellow precipitate is obtained. The latter is decolorized in an ethyl acetate-isopropanol mixture by means of charcoal. Upon concentration of this solution the 3-[N-morpholinoethyl)benzamido] - 2,3 - dihydrothionaphthene - 1,1 - dioxide hydrochloric precipitates which melts at about 250–251° C. It has the formula

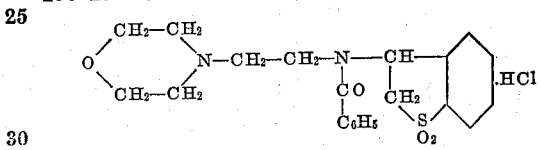

I claim:
1. A compound of the structural formula

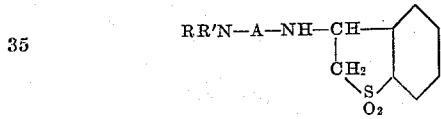

wherein A is a lower alkylene radical separating the two nitrogen atoms attached thereto by at least two carbon atoms and RR'N is a member of the class consisting of morpholino, pyrrolidino and piperidino radicals and radicals wherein R and R' are members of the class consisting of hydrogen and lower alkyl radicals.

2. A compound of the structural formula

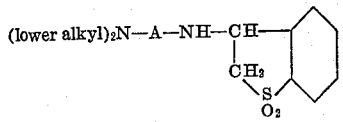

wherein A is a lower alkylene radical separating the two nitrogen atoms attached thereto by at least two carbon atoms.

3. 3 - (β - diethylaminoethyl)amino - 2,3 - dihydrothionaphthene-1,1-dioxide.

4. A compound of the structural formula

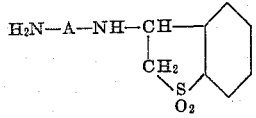

wherein A is a lower alkylene radical separating the two nitrogen atoms attached thereto by at least two carbon atoms.

5. A compound of the structural formula

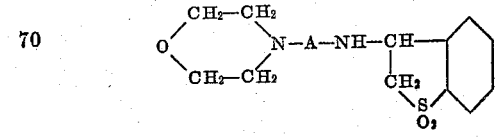

wherein A is a lower alkylene radical separating the two nitrogen atoms attached thereto by at least two carbon atoms.

6. 3 - (N - morpholinoethyl) amino - 2,3 - dihydronaphthene-1,1-dioxide.

7. A compound of the structural formula

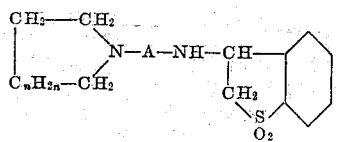

wherein A is a lower alkylene radical separating the two nitrogen atoms attached thereto by at least two carbon atoms, and $n$ is a positive integer less than 3.

8. A compound of the structural formula

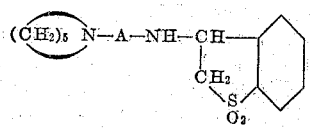

wherein A is a lower alkylene radical separating the two nitrogen atoms attached thereto by at least two carbon atoms.

9. A compound of the structural formula

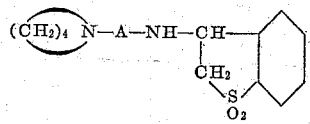

wherein A is a lower alkylene radical separating the two nitrogen atoms attached thereto by at least two carbon atoms.

JOHN W. CUSIC.

No references cited.